United States Patent [19]

Sopko

[11] 4,031,343
[45] June 21, 1977

[54] BICYCLE BRAKE LIGHT SWITCH AND STOP LIGHT SYSTEM BEING ACTIVATED BY HAND BRAKE LEVER AND CABLE

[76] Inventor: Roy Sopko, 21 Huckleberry Lane, Holbrook, N.Y. 11741

[22] Filed: Sept. 2, 1975

[21] Appl. No.: 609,301

[52] U.S. Cl. .................... 200/61.12; 200/61.87; 200/161; 340/69; 340/134

[51] Int. Cl.² ............... B60Q 1/44; B62J 5/00; H01H 3/16; H01H 17/08

[58] Field of Search ............ 200/61.12, 61.87, 157, 200/161; 340/69, 71, 134; 188/24; 240/755

[56] References Cited

UNITED STATES PATENTS

| | | | |
|---|---|---|---|
| 3,188,418 | 6/1965 | Piho | 188/24 X |
| 3,435,165 | 3/1969 | Lombard | 200/161 X |
| 3,521,233 | 7/1970 | Inove | 200/61.12 X |
| 3,703,620 | 11/1972 | Watanabe | 200/161 |
| 3,870,846 | 3/1975 | Filip | 200/161 |

FOREIGN PATENTS OR APPLICATIONS 1,051,129   9/1953   France .................... 340/134

*Primary Examiner*—James R. Scott
*Attorney, Agent, or Firm*—Howard C. Miskin

[57] ABSTRACT

A bicycle stop light is energized by the contraction of the hand operated caliper brakes and includes a first contact member mounted on and insulated from the flexible brake actuating cable extending between the proximal ends of the brake caliper levers and anchored to a first lever end, the cable sheath being anchored to the second lever end by an axially adjustable threaded sleeve affixed to the sheath. The first contact member is spring biased toward the threaded sleeve which defines a frame grounded second contact member, the first contact member being grounded in series with a battery and stop light to the bicycle frame.

5 Claims, 3 Drawing Figures

BICYCLE BRAKE LIGHT SWITCH AND STOP LIGHT SYSTEM BEING ACTIVATED BY HAND BRAKE LEVER AND CABLE

BACKGROUND OF THE INVENTION

The present invention relates generally to improvements in bicycles and it relates more particularly to an improved bicycle stop light control mechanism.

The conventional bicycle, while commonly provided with a tail light is generally lacking in a stop light, that is a bright rear warning light, in addition to the tail light, which is energized only upon the actuation of the brakes. The provision of a stop light in automobiles and other motor vehicles is understandably a legal requirement and its absence in a bicycle represents a dangerous lack of safety which could lead to many serious accidents. Many bicycle stop light systems have heretofore been proposed but these have been complicated, expensive and unreliable devices which are difficult and expensive to install and otherwise leave much to be desired.

SUMMARY OF THE INVENTION

It is therefore a principle object of the present invention to provide an improved bicycle accessory.

Another object of the present invention is to provide an improved bicycle warning light system.

Still another object of the present invention is to provide an improved mechanism for energizing a bicycle stop light incident to the braking of the bicycle.

A further object of the present invention is to provide an improved bicycle stop light energizing mechanism which is actuated in response to the application of the hand operated bicycle caliper wheel brakes.

Still a further object of the present invention is to provide a mechanism of the above nature characterized by its ruggedness, simplicity, reliability, low cost, ease of application, and great versatility and adaptability.

The above and other objects of the present invention will become apparent from a reading of the following description taken in conjunction with the accompanying drawing which illustrates a preferred embodiment thereof.

In a sense the present invention contemplates the provision in combination with a bicycle having a hand operated caliper brake including a pair of relatively rockable caliper levers having opposing first and second proximal ends remote from the lever braking ends and swingable between contracted braking and spread release positions and a sheathed control cable member having a sheath anchored to the first lever proximal end and a flexible cable extending through the sheath and anchored to the second lever proximal end, a stop light mechanism comprising an electric bulb a source of current and a normally open switching means connected in series with the bulb across the current source and including a switch component mounted on the flexible cable between the first and second lever proximal ends and engagable by the first lever proximal and incident to the contraction of the caliper levers to transfer the switching means to a closed condition.

In the preferred form of the present device the switch component includes an insulator sleeve secured to the flexible cable between the lever proximal ends and a cylinder coaxial with the insulator sleeve and having an open front end facing the first lever proximal end. A cup shaped metal sleeve having a centrally apertured inner end wall slidably engages the cylinder and a piston likewise having a centrally apertured inner end wall slidably engages the metal sleeve, a helical compression spring being entrapped between the sleeve and piston end walls. The uncovered end of a cable connected to the series connected battery and bulb enters an opening in the cylinder peripheral wall and is clamped between the cylinder and sleeve end walls under pressure of the spring. The piston functions as a switch contact member which cooperates with a threaded rotatable sleeve mounted on the sheath and engaging a tapped opening in the first lever proximal end the sleeve deforming a grounded second contact member which engages the piston upon brake actuation to close the switch and is permitted to advance with the retraction of the piston against the influence of the spring.

The improved switch or contact device is a simple unit which is easy to mount on the caliper brake and the resulting stop light system is rugged and reliable.

DESCRIPTION OF THE PREFERRED EMBODIMENT

Figure 1:
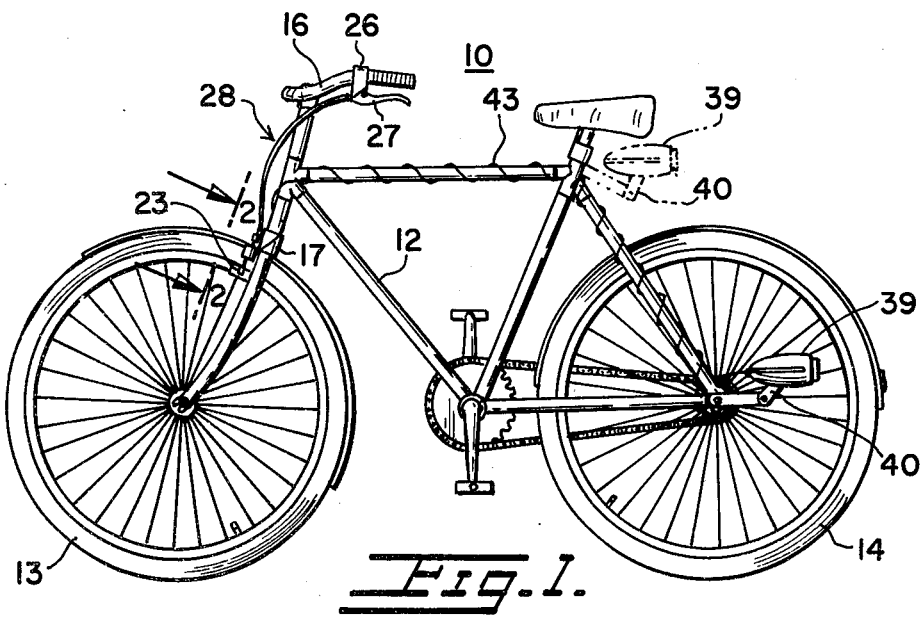
FIG. 1 is a side elevational view of a bicycle provided with the improved stop light system.

Referring now to the drawing which illustrates a preferred embodiment of the present invention, the reference numeral 10 generally designates a bicycle of conventional construction and provided with the improved rear stop light system 11. The bicycle 10 includes a metal main frame 12 provided at its front with a steering yoke supported front wheel 13 and a pedal motivated sprocket chain driven rear wheel 14. The front wheel 13 can be manually turned by a handle bar 16 mounted atop the shank of the front wheel bearing yoke.

Associated with the front wheel 13 and mounted on the yoke upper cross piece 17 is a caliper type brake 18 of known construction, it being noted that a similar type of brake may be associated with the rear wheel with or without the front brake 18. The brake 18 includes a pair of caliper first and second levers 19 and 20 respectively including distal positions carrying brake shoes 23 confronting the opposite faces of the rim of wheel 13 and first and second lever proximal positions 21 and 22 respectively. The caliper levers 19 and 20 are pivotally mounted to the yoke shank by a pivot stud 27 and are spring biased to an open position with the brake shoes 23 disengaging the wheel rim and the lever proximal ends 21 and 22 spread apart.

Mounted on the handle bar by means of a bracket 26 is a pivoted hand opetated lever 27. A braking control cable 28 extends from the lever 27 to the caliper brake 18 and includes a flexible sheath secured at its proximal end to the bracket 26 and terminating at its distal end in an externally threaded elongated sleeve 30 which is axially rotatable relative to the sheath 29 and is provided at its inner end in a knurled knob 32. Mounted on the outer end of the first lever proximal position 21 is a short post 33 having a tapped diametric bore engaged by the threaded sleeve 30 which projects beyond the post 33 and permits the axial adjustment and the anchoring of the distal end of the sheath 29 to the post 33. The sleeve 33 is releasably locked to a preset position by a lock nut 34 engaging the sleeve 30 and bearing on the post 33.

A flexible cable 36 is longitudinally slidable in the sheath 29 and has its distal end connected to the hand lever 27 at a point offset from its pivot axis. The cable 36 extends through the sleeve 30 and to an anchor block 37 located proximate to the free end of the second proximal lever position 22, the cable being adjustably and separably connected to the anchor block 37 and releasably locked thereto in the known manner. Thus by compressing the hand lever 27 the cable 36 is drawn inwardly relative to the sheath 29 to contract the proximal ends and the distal ends of the caliper levers 19 and 20 and bring the brake shoes 23 into braking engagement with the wheel rim against the spring bias separating the caliper levers. Release of the hand lever 27 effects the separation of the caliper levers and the release of the brake under the influence of the biasing spring.

The stop light system 11 includes a rearwardly directed lamp housing 39 mounted by an adjustable bracket 40 in any desired position of the rear of the bicycle frame 12 and encloses a socket replacing holding an electric bulb 41. One terminal of the bulb holding socket is grounded to the frame 12 through the bracket 40 and the other terminal thereof is connected through a battery 42 housed in and replacably held by a battery holder in the housing 39 to one end of a covered conductor wire 43 which is wrapped around the legs of frame 12 and extends to the front of the bicycle.

Mounted on the flexible cable 36 between post 33 and block 37 is a switch component 44 which includes an inner axial sleeve 44 formed of a flexible insulating material for example, polyethylene or the like and which engages the flexible cable 36 and has an inside diameter slightly greater than the outside diameter of cable 36. An outwardly directed peripheral lip or flange is formed in the front end of the sleeve 46, that is the end proximate and confronting the externally threaded sleeve 30 held by post 33. A tubular cylinder 48 is coaxial with insulator sleeve 46 and is closed at its rear by a heavy end wall 49 having an axial bore engaging insulator sleeve 46 and a tapped transverse bore engaged by screw 50 which bears on sleeve 46 and adjustably locks the sleeve 46 and cylinder 49 to the cable 36. An opening 51 is formed in the cylinder peripheral wall proximate end wall 49 and the uncovered end of the wire 43 enters the cylinder interior through opening 51.

Figure 2:
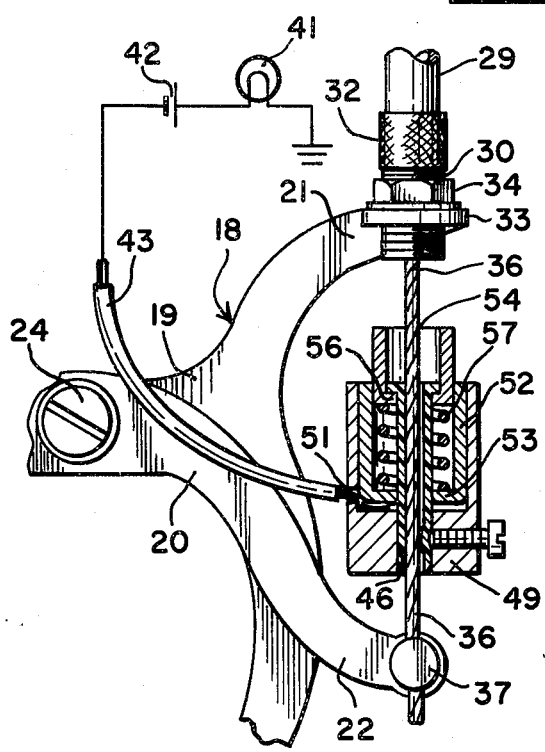
FIG. 2 is a fragmented sectional view taken along line 2—2 in FIG. 1, showing the switch in open condition.
Figure 3:
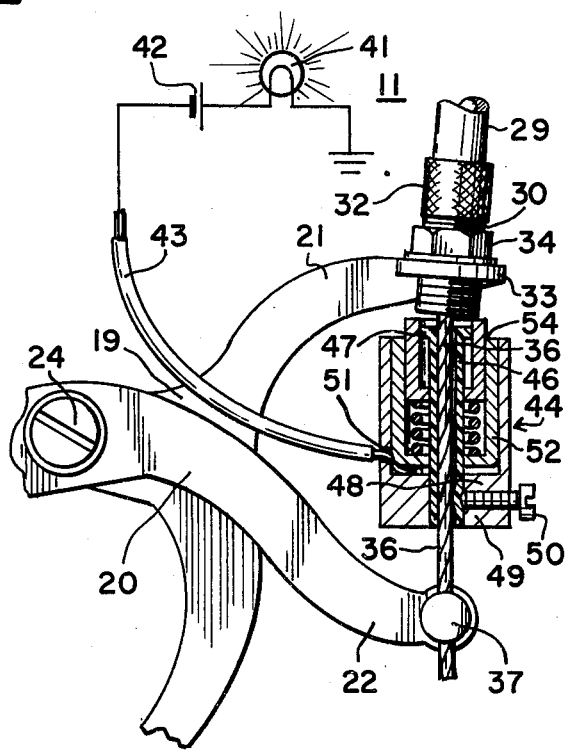
FIG. 3 is a view similar to FIG. 2 showing the switch in closed condition.

A metal sleeve 52 axially slidably nests in the cylinder 48 and includes a rear inner wall 53 having a central opening slidably engaging insulator sleeve 46. In turn a hollow tubular contact member deferring piston 54 slidably telescopes the sleeve 52 and projects forwardly thereof and is provided with an inwardly directed peripheral flange 56 which is disposed inwardly of insulator sleeve flange 47 and slidably engages insulator sleeve 46. A helical compression spring 57 is coaxially housed in sleeve 52 and is entrapped between piston flange 56 and sleeve end wall 53 to resiliently urge piston 54 forwardmost, as shown in FIG. 2 and sleeve 52 rearwardly to clamp the uncovered end of wire conductor 43 between the confronting faces of walls 49 and 53 thereby electrically connecting the conductor 43 to contact piston 54.

In mounting the switch component 44 the flexible cable 36 is separated from the block 37 to free the end of the cable 36 and the cable 36 is threaded through the insulator sleeve 46 with lock screw 50 loosened and the cable 36 is then anchored to block 37 so that the brake is in its desired adjusted position. The bare end of conductor 43 is inserted through opening 51 between the end walls 49 and 53, such insertion being facilitated by the outward movement of sleeve 52 against spring 57. The component is then slid along cable 36 until the forward end of piston 54 is proximate to and spaced from the free end of metal sleeve 30, preferably about 1/16 inch and the screw 50 is tightened to lock the switch assembly 44 to the cable 36. In this position without the depression of the hand lever 27, the proximal end of the conductor 43 is electrically connected to the contact piston 54 which is ungrounded and floating by reason of the insulator sleeve 46 so that the energizing circuit of lamp 41 is open.

Upon the initiation of the hand braking operation, the hand lever 27 is compressed to actuate the caliper brake and contract the lever proximal arms 21 and 22. As a consequence upon the initial compression of lever 27, the threaded metal sleeve 30 which is grounded to the frame 12 by way of post 33 is brought into contact with the outer end face of contact piston 54 to ground the conductor 43 and hence complete the energizing circuit of bulb 41 to ignite the bulb. Further compression of the caliper levers and tightening of the brake is permitted by reason of the axial movement of the piston 54 in sleeve 52 against the influence of the spring 57. With the release of the hand lever 27, the threaded sleeve 30 is retracted from piston contact 54 upon full release of the brake attendant to the opening of the caliper levers 19 and 20 to open the bulb energizing circuit.

While there has been described and illustrated a preferred embodiment of the present invention, it is apparent that numerous alterations, omissions and additions may be made without departing from the spirit thereof. For example, the switch and brake levers have been shown associated with the bicycle front wheel but it may be associated with the rear wheel or with both wheels.

What is claimed is:

1. In combination with a bicycle having a hand operated caliper brake including a pair of relatively rockable caliper levers having first and second proximal ends remote from the lever braking ends and swingable between contracted braking and spread release positions and a sheathed control cable member having a sheath anchored to said first proximal end and a flexible cable extending through said sheath and anchored to said second proximal end, a stop light mechanism comprising an electric bulb, a source of current and normally open switching means connected in series with said bulb across said current source, and including a switch component mounted on said flexible cable between said first and second proximal ends and engageable by said first proximal end incident to the contraction of said caliper levers to transfer said switching means to a closed condition, said switch component comprising a first contact member fixedly mounted on and insulated from said flexible cable and adjustable along the length thereof and resiliently biased toward said first proximal end, said first proximal end being provided with a second contact member defining portion which is grounded to the frame of said bicycle and said first contact member being connected in series with said bulb and current source to said bicycle frame.

2. The combination of claim 1 wherein said switch component comprises an insulator sleeve secured to said flexible cable, cylinder secured to said sleeve and having an open and confronting said second contact member, a metal piston axially movable in and out of said cylinder and spring biased toward said first contact member and resiliently movable into said cylinder.

3. The combination of claim 2 including a metal sleeve coaxial with and slidable sandwiched between said piston and cylinder and having centrally apertured inner end wall and a compression spring entrapped between said inner end wall and said piston to bias said piston and metal sleeve outwardly and inwardly respectively.

4. In combination with a bicycle having a hand operated caliper brake including a pair of relatively rockable caliper levers having first and second proximal ends remote from the lever braking ends and swingable between contracted braking and spread release positions and a sheathed control cable member having a sheath anchored to said first proximal end and a flexible cable extending through said sheath and anchored to said second proximal end, a stop light mechanism comprising an electric bulb, a source of current and normally open switching means connected in series with said bulb across said current source, and including a switch component mounted on said flexible cable between said first and second proximal ends and engageable by said first proximal end incident to the contraction of said caliper levers to transfer said switching means to a closed condition, said first proximal end being provided with a contact member defining portion which is grounded to said bicycle frame and said switch-component comprises an insulator sleeve secured to said flexible cable, a cylinder secured to said sleeve and having an open end confronting said contact member and an opposite end wall and a peripheral wall with a radial bore proximate said cylinder end wall, a metal piston movable in and out of said cylinder, a metal sleeve coaxial with and slidably sandwiched between said piston and cylinder and having a centrally apertured inner end wall and a compressor spring entrapped between said inner end wall and said piston to bias said piston and metal sleeve outwardly and inwardly respectively, and a cable conductor passing through said radial bore and clamped between the confronting walls of said cylinder and metal sleeve, said cable conductor being connected in series with said current source and bulb to said bicycle frame.

5. The combination of claim 4 including an internally threaded member mounted on said first distal end, said sheath terminating in an externally threaded sleeve engaging said internally threaded member and axially projecting toward said first contact member and defining said second contact member.

* * * * *